(12) United States Patent
Hoshyar et al.

(10) Patent No.: US 11,688,410 B2
(45) Date of Patent: Jun. 27, 2023

(54) RECEIVE PATH IN-PHASE AND QUADRATURE IMBALANCE CORRECTION USING CIRCUIT NOISE

(71) Applicant: MAXLINEAR, INC, Carlsbad, CA (US)

(72) Inventors: Reza Hoshyar, San Jose, CA (US); Hossein Dehghan, Diablo, CA (US); Abhishek Kumar Agrawal, Fremont, CA (US); Kapil Gulati, Sunnyvale, CA (US); Eugenio Rivera Ramos, Seattle, WA (US); Shivashankar Beesanahalli, Fremont, CA (US); Georgy Gilyarovskiy, Moscow (RU)

(73) Assignee: MaxLinear, Inc., Carlsbad, CA (US)

( * ) Notice: Subject to any disclaimer, the term of this patent is extended or adjusted under 35 U.S.C. 154(b) by 29 days.

(21) Appl. No.: 17/317,137

(22) Filed: May 11, 2021

(65) Prior Publication Data
US 2022/0084536 A1    Mar. 17, 2022

(30) Foreign Application Priority Data
Sep. 14, 2020    (RU) ............................ RU2020130229

(51) Int. Cl.
*G10L 21/0232*    (2013.01)
*G10L 25/18*    (2013.01)
*H04L 27/38*    (2006.01)

(52) U.S. Cl.
CPC .......... *G10L 21/0232* (2013.01); *G10L 25/18* (2013.01); *H04L 27/3872* (2013.01)

(58) Field of Classification Search
CPC . G10L 21/0232; G10L 25/18; H04L 27/3872; H04L 27/3863
See application file for complete search history.

(56) References Cited

U.S. PATENT DOCUMENTS

| 10,484,108 | B1* | 11/2019 | Al-Qaq ............... H04L 27/3863 |
| 2006/0198475 | A1* | 9/2006 | Wu ........................ H03D 3/009 375/346 |
| 2011/0013724 | A1* | 1/2011 | Metreaud ............ H04L 27/3863 375/345 |
| 2011/0216858 | A1 | 9/2011 | Zeng |

(Continued)

FOREIGN PATENT DOCUMENTS

| KR | 20100063654 A | * | 6/2010 |
| WO | WO-2007005392 | * | 1/2017 |

OTHER PUBLICATIONS

Machine Translation of KR-20100063654-A. (Year: 2023).*

(Continued)

*Primary Examiner* — Jean B Corrielus
(74) *Attorney, Agent, or Firm* — Buchalter; Jason W. Croft (57) ABSTRACT

Example operations may include determining a first noise estimate of noise that propagates along a receive path of a device. The operations may further include determining a second noise estimate of the noise and determining a cross-relationship estimate with respect to the noise. In addition, the operations may include adjusting one or more correction filters configured to correct for imbalances between a first branch and a second branch of the receive path. The adjusting may be based on the first noise estimate, the second noise estimate, and the cross-relationship estimate.

19 Claims, 7 Drawing Sheets

(56) References Cited

U.S. PATENT DOCUMENTS

| | | | |
|---|---|---|---|
| 2011/0222638 A1 | 9/2011 | Park et al. | |
| 2014/0362955 A1* | 12/2014 | Muhammad | H04L 27/2278 375/343 |
| 2017/0093609 A1* | 3/2017 | Avraham | H04L 27/364 |

OTHER PUBLICATIONS

Kawai, et al. "A 1024-QAM Capable WLAN Receiver with -56.3 dB Image Rejection Ratio using Self-Calibration Techniques", 2017 IEEE International Symposium on Circuits and Systems (ISCAS).

\* cited by examiner

RECEIVE PATH IN-PHASE AND QUADRATURE IMBALANCE CORRECTION USING CIRCUIT NOISE

FIELD

The implementations discussed in the present disclosure relate to receive path in-phase and quadrature imbalance correction using circuit noise.

BACKGROUND

Unless otherwise indicated in the present disclosure, the materials described in the present disclosure are not prior art to the claims in the present application and are not admitted as being prior art by inclusion in this background section.

Quadrature-based signals are commonly used in signal processing and signal communication (e.g., wireless communications) to transmit and carry data. In many applications, a quadrature-based modulation scheme may incorporate a first signal and a corresponding second signal that has substantially the same frequency as the first signal but that is offset from the first signal with a 90 degree phase shift.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

Example operations may include determining a first noise estimate of noise that propagates along a receive path of a device. The operations may further include determining a second noise estimate of the noise and determining a cross-relationship estimate with respect to the noise. In addition, the operations may include adjusting one or more correction filters configured to correct for imbalances between a first branch and a second branch of the receive path. The adjusting may be based on the first noise estimate, the second noise estimate, and the cross-relationship estimate.

BRIEF DESCRIPTION OF THE DRAWINGS

Example implementations will be described and explained with additional specificity and detail using the accompanying drawings in which.

DETAILED DESCRIPTION

Implementations described herein may generally include systems and methods related to processing quadrature phase signals. Signals with substantially the same frequency but that have a phase difference between each other that is one-fourth or approximately one-fourth of the periods of the signals (i.e., a phase difference of 90 degrees or approximately 90 degrees) may be referred to herein as "quadrature-phase," "quadrature-type," quadrature-based," or "quadrature signals." In many applications, a first quadrature signal may be referred to as an in-phase (I) signal ("I-signal") and a corresponding second quadrature signal with the 90-degree phase offset may be referred to as a quadrature-phase (Q) signal ("Q-signal"). In the present disclosure, general reference to the I and Q signals may include such signals in any applicable state, such as the I and Q signal components modulated and combined onto a carrier signal, analog baseband I and Q signals, or digital baseband I and Q signals.

In some signal processing, quadrature signals may be used to communicate data. For example, the I-signal and the Q-signal may carry first data and second data, respectively, and may be combined and modulated using any suitable quadrature-based modulation scheme, such as Quadrature Amplitude Modulation (QAM), Quadrature Phase Shift Keying (QPSK), or the like.

In wireless communication that utilizes quadrature signals, the combined quadrature signal transmitted via a carrier signal may be received at a receive path of a receiver system of a device. The receive path may include components that may pull the baseband I-signal and the baseband Q-signal from the received signal. The baseband I-signal may propagate along an I-signal branch ("I branch") of the receive path and the baseband Q-signal may propagate along a separate Q-signal branch ("Q branch") of the receive path. In some instances, the components used to obtain the baseband I and Q signals from the received signal and differences between the I branch and the Q branch may create imbalances between the I branch and the Q branch, which may create imbalances between the baseband I and Q signals. For example, as detailed further below, a mixer configured to obtain the baseband I and Q signals may have a phase mismatch that may cause the baseband I and Q signals to have imbalances. Further, the differences between the I and Q branches may cause propagation delays between the baseband I and Q signals, which may contribute to the imbalances between the baseband I and Q signals. Additionally or alternatively, the I and Q branches may have frequency dependent gain and/or phase mismatches, which may also contribute to the imbalances. The imbalances may degrade the signal quality.

In some implementations, digital circuitry of the receive path may include one or more correction filters that may be configured to adjust the baseband I and Q signals to help correct for the imbalances. Additionally or alternatively, the parameters of the correction filters may be set during a calibration of the associated chips prior to distribution of the associated chips for use. However, the imbalances may vary or change over time according to different operating conditions such as temperature, amount of use, etc. Therefore, the initial calibration settings of the correction filter parameters may be such that imbalance correction may degrade during certain operating conditions. Further, the calibration of the correction filters prior to distribution often uses a training signal generated by specialized lab equipment via a somewhat time consuming process. Therefore, the initial calibration may add an increased cost to the development and distribution of associated chips.

According to one or more implementations of the present disclosure and as explained in detail below, run-time calibration of correction filters may be performed based on receiver circuit noise that propagates along a receive path of a device. The run-time calibration may accordingly adjust the correction filters based on current operating conditions, which may improve the run-time performance of the correction filters.

These and other implementations of the present disclosure are explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

Figure 1:
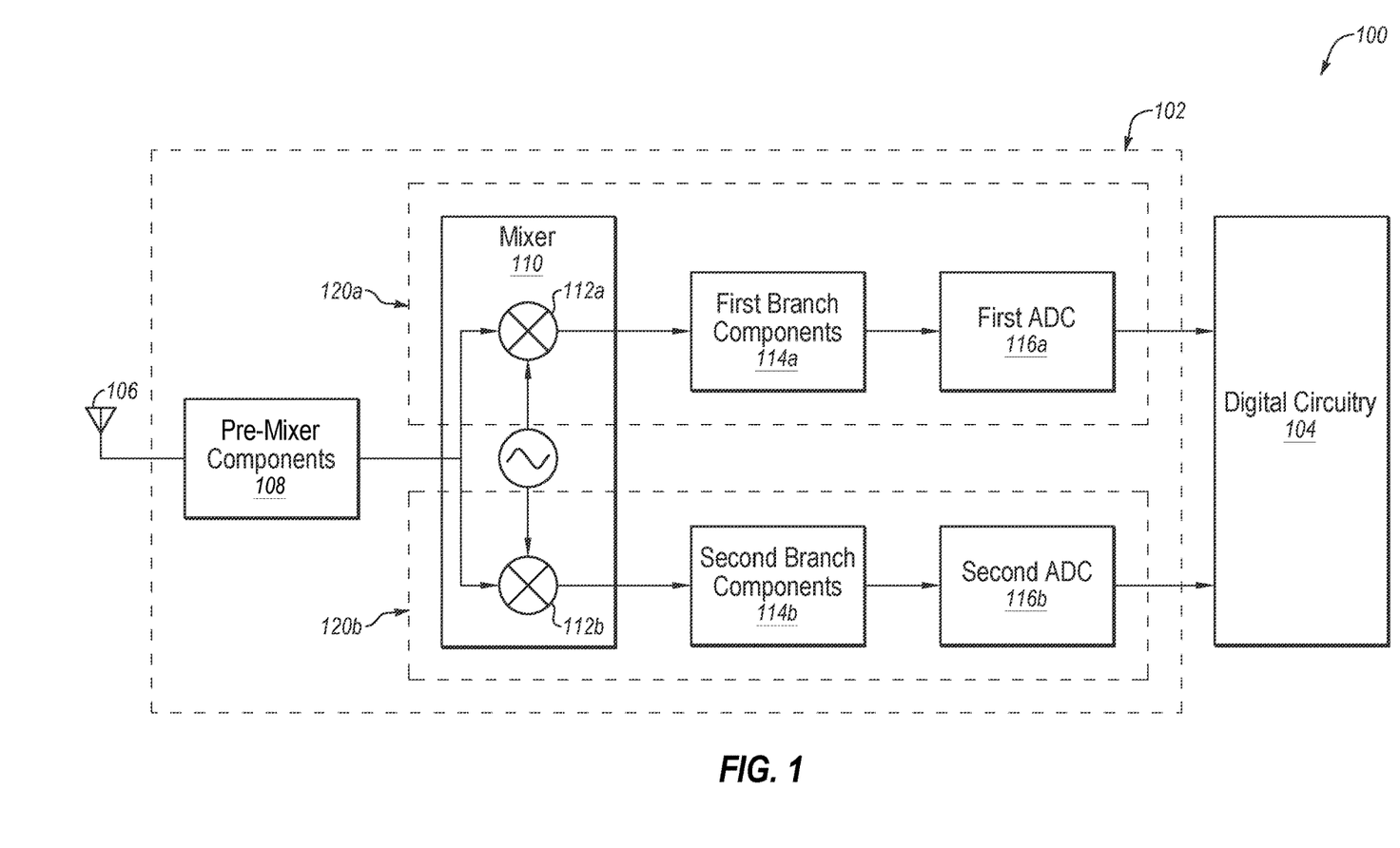
FIG. 1 illustrates a block diagram of selected components of an example receiver system configured to adjust for imbalances between branches of a receive path.

FIG. 1 illustrates a block diagram of selected components of an example receiver system 100 ("system 100") configured to adjust for imbalances between branches of a receive path. The system 100 may be configured according to one or more implementations of the present disclosure. The system 100 may be included in any suitable device configured to perform wireless communications and/or coupled to any suitable network. For example, the system 100 may be included in a device that may operate as an access point of a wireless network, which may include any suitable system or device that may establish the wireless network and/or communicatively couple the wireless network with another network. By way of the example, the access point(s) may include a gateway, a repeater, a mesh node, and/or other suitable access point that wirelessly couples the other devices of the wireless network to each other and/or to another network (e.g., the Internet and/or a core network via a bridge, a backhaul link, a base station, and/or other suitable devices or connections).

Additionally or alternatively, the device may operate as a node of the wireless network. For example, a node of the wireless network may generally include any device that has the capability to wirelessly connect to an access point of the wireless network according to any suitable wireless standard of the wireless network (e.g., the 802.11 standards, cellular communication standards, etc.). By way of example, the node(s) may include a desktop computer, a laptop computer, a tablet computer, a mobile phone, a smartphone, a personal digital assistant (PDA), a smart television, or any other suitable device.

The device may be configured to operate in any number of different types of environments. For example, the environment or environments in which the device may be configured to operate may include, individually or any suitable combination thereof, a home environment, an Internet of Things (IoT) environment, a vehicle environment, or any other suitable environment that may include or incorporate a wireless network to facilitate the communication of data between devices.

The network to which the device may be communicatively coupled may include any suitable network that may be established to communicate data between devices. For example, the network may include a wireless local area network (LAN) and/or a wireless telecommunications network. For instance, the network may include or be configured to include a cellular network (e.g., 4G, 5G, LTE, network), a wireless fidelity network (e.g., 802.11 WI-FI® network), a BLUETOOTH® network, a Z-WAVE® network, an INSTEON® network, an ENOCEAN® network, a ZIGBEE® network, network, etc. In some implementations, the network may be communicatively coupled to or included in another network such as a wide area network (WAN) (e.g., the Internet) and/or any other suitable interconnected data paths across which multiple devices may communicate.

The system 100 may include an antenna 106, a receive path 102, and digital circuitry 104. The antenna 106 may be configured to receive wireless signals (e.g., modulated electromagnetic waves) and to convert the received wireless signals into corresponding analog electrical signals (referred to as "analog signals"), which may propagate along the receive path 102.

In some implementations, the receive path 102 may include pre-mixer components 108 that may receive signals produced by the antenna 106. The pre-mixer components 108 may include a band-pass filter and/or a low noise amplifier in some implementations. For example, the band-pass filter may be configured to pass signal components and noise in the band of interest associated with the received wireless signals (e.g., the carrier frequency band) and remove out-of-band noise. The low-noise amplifier (LNA) may be configured to amplify signals filtered by the band-pass filter. In some embodiments, the pre-mixer components 108 may also produce noise (e.g., thermal noise) that may propagate through the receiver path 102.

The receive path 102 may include a mixer 110 configured to receive the filtered and/or amplified signals and noise produced by the pre-mixer components 108. The mixer 110 may be configured to obtain the baseband I-signal from a corresponding analog signal by multiplying (e.g., via a first multiplier 112a) the analog signal by a first reference signal that has substantially the same frequency as the carrier signal. The mixer 110 may also be configured to obtain the baseband Q-signal from the analog signal by multiplying (e.g., via a second multiplier 112b) the analog signal by a second reference signal that is substantially the same as the first reference signal but with a 90-degree offset.

The mixer 110 may also include an oscillator 114, which may include any suitable device, system, or apparatus configured to produce the first reference signal and the second reference signal. For example, the oscillator 114 may be configured to generate the first reference signal as represented by $2\cos(2\pi f_c t)$ in which $f_c$ is the carrier frequency. Further, the oscillator 114 may be configured to generate the second reference signal as represented by $-2\sin(2\pi f_c t)$ such that the first reference signal and the second reference signal are offset by 90 degrees. However, the oscillator 114 may be such that the phase offset between the first reference signal and the second reference signal may not be exactly 90 degrees. This deviation from the 90 degree offset may be referred to as "phase mismatch" of the mixer 110 and may be represented by "$\phi$", which represents the amount that the offset is off from 90 degrees. For example, a phase mismatch in which $\phi$ equals "5" may be a result of the phase offset of the first reference signal and the second reference signal being 95 degrees instead of 90 degrees. The phase mismatch of the mixer 110 may contribute to the imbalances between the baseband I and Q signals.

The receive path 102 may include a first branch 120a and a second branch 120b. The first branch 120a may be configured for the baseband I-signal and the second branch 120b may be configured for the baseband Q-signal. For example, the first branch 120a may include the first multiplier 112a and may receive signals output by the multiplier 112a (e.g., the baseband I-signal). The second branch 120b may include the second multiplier 112b and may receive signals output by the multiplier 112b (e.g., the baseband Q-signal). In addition, first noise (e.g., thermal noise) may be present within the first branch 120a in which the first noise may be produced by one or more components of the receive path 102. Similarly, second noise (e.g., thermal noise) may be present within the second branch 120b.

The first branch 120a may include first branch components 114a that may be configured to perform one or more operations. The operations of the first branch components 114a may include filtering and/or amplifying of signals and/or noise that propagate along the first branch 120a. The second branch 120b may similarly include second branch components 114b that may be configured to perform similar or analogous filtering and/or amplifying operations.

The first branch 112a and the second branch 112b may have one or more differences that may cause imbalances between the baseband I-signals and the baseband Q-signals. For example, the propagation paths of the first branch 112a and 112b may not be the exact same lengths. This may cause a delay miss-match between the two branches. Further the two branches might not have exactly the same gain, which may create a gain imbalance between them. As another example, the operations performed by the first branch components 114a may not be exactly the same as the operations performed by the second branch components 114b. The differences between the first branch 112a and the second branch 112b may be such that the respective transfer functions of the branches 112 may differ.

The difference in the transfer functions may be represented by a ratio between the respective transfer functions. For example, a first transfer function of the first branch 120a may be denoted as G1(f) and a second transfer function of the second branch 120b may be denoted as G2(f). The branch imbalance between the first branch 120a and the second branch 120b ("$\Gamma(f)$") may be represented by the following expression (1):

$$\Gamma(f) = \frac{G2(f)}{G1(f)} \quad (1)$$

The above expression is merely an example, for instance, the branch imbalance may alternatively be expressed by having the first transfer function divided by the second transfer function. In a scenario with no branch imbalance, the first transfer function and the second transfer function would be equal such that $\Gamma(f)$ would be equal to one. Therefore, the more that $\Gamma(f)$ approaches zero or infinity (depending on which ratio is used) the greater the branch imbalance.

The first branch 120a may include a first analog to digital converter (ADC) 116a and the second branch 120b may include a second ADC 116b. The first ADC 116a may digitize the signals and first noise that are output by the first branch components 114a and the second ADC 116b may digitize the signals and second noise that are output by the second branch components 114b.

The digital circuitry 104 may be configured to process the digital signals (e.g. digital baseband I-signals) and/or digitized first noise output by the first ADC 116a. Additionally or alternatively, the digital circuitry 104 may be configured to process the digital signals (e.g. digital baseband Q-signals) and/or digitized second noise output by the second ADC 116b.

Additionally or alternatively, the digital circuitry 104 may be configured to direct operations related to the reception and processing of the signals and noise. One or more elements of the digital circuitry 104 may be hardware that is custom designed to perform one or more of the receiver operations. Additionally or alternatively, one or more of the elements of the digital circuitry 104 may include a computing system that is programmed to perform certain operations using computer-executable instructions. One or more elements of the computing system 502 of FIG. 5 may be included in or part of the digital circuitry 104 in some implementations.

As detailed below, the digital circuitry 104 may be configured to determine a first noise estimate of the first noise and of the second noise of the first receive path 120a and the second receive path 120b, respectively. Further, the digital circuitry 104 may be configured to determine a cross-relationship estimate with respect to the first noise and the second noise. The digital circuitry 104 may also include one or more correction filters configured to perform compensation operations to help compensate for the phase mismatch and/or branch imbalance. The digital circuitry 104 may be configured to adjust the one or more correction filters based on the first noise estimate, the second noise estimate, and the cross-relationship estimate.

Modifications, additions, or omissions may be made to the system 100 without departing from the scope of the present disclosure. For example, the system 100 may be configured to perform any number of other operations than those explicitly described.

Figure 2A:
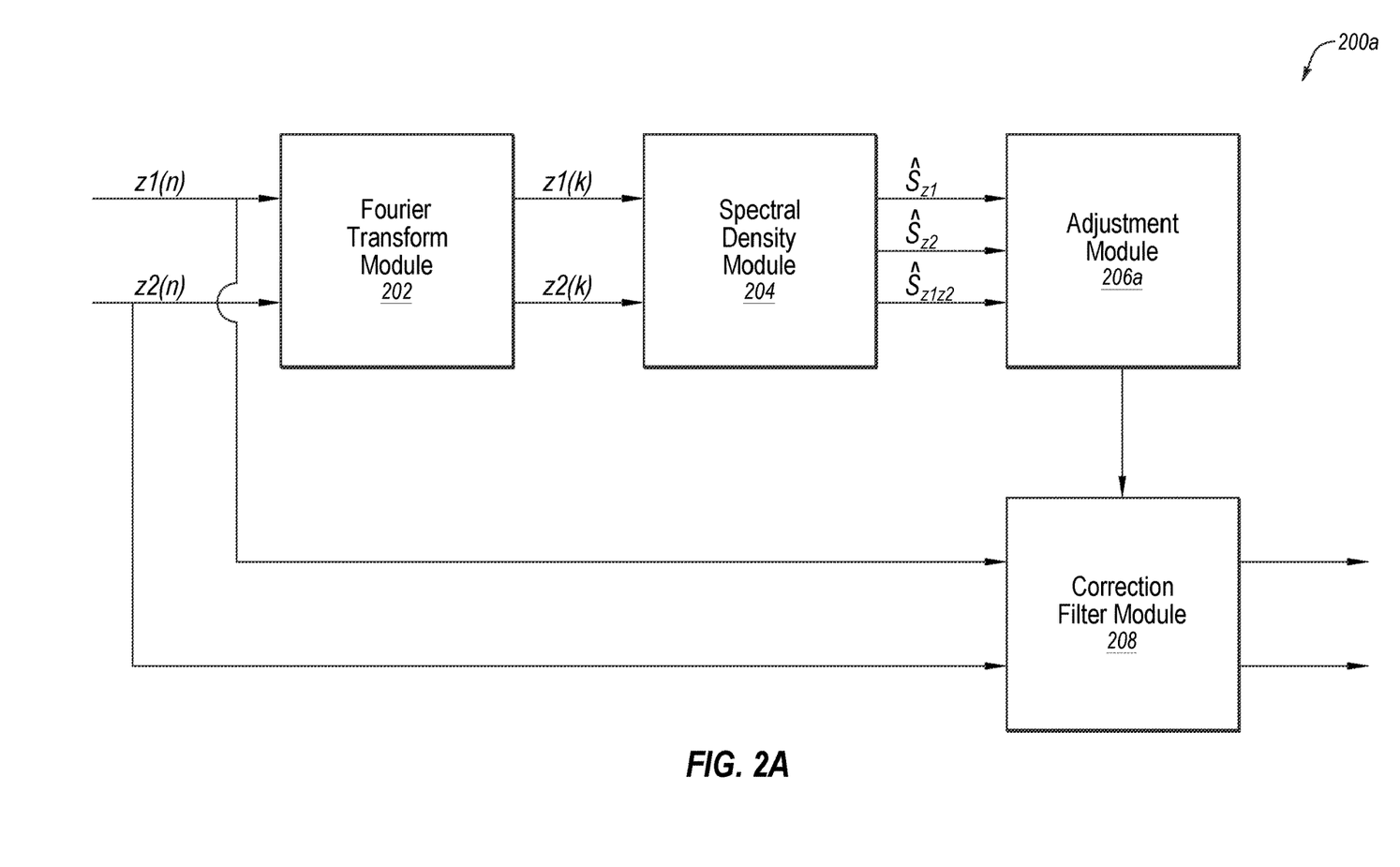
FIG. 2A illustrates an example signal processing system configured to adjust for imbalances between branches of a receive path.

FIG. 2A illustrates an example signal processing system 200a ("system 200a") configured to adjust for imbalances between branches of a receive path, according to one or more implementations of the present disclosure. The system 200a may be part of digital circuitry of a receiver system. For example, the system 200a may be included in the digital circuitry 104 of FIG. 1. Moreover, the system 200a may be included in or implemented as a computing system, such as the computing system 502 described below with respect to FIG. 5.

The system 200a may include a Fourier transform module 202, a spectral density module 204, an adjustment module 206a, and a correction filter module 208. One or more of the modules of FIG. 2A and of FIGS. 2B, 3A, and 3B discussed further below may include code and routines configured to enable a computing system to perform one or more of the operations described therewith. Additionally or alternatively, one or more of the modules may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

The Fourier transform module 202 ("FT module 202") may be configured to perform a Fourier transform on received signals and/or noise. For example, the FT module 202 may be configured to receive first noise that propagates along a first branch of a receive path, such as the first noise that propagates along the first branch 120a of FIG. 1. The digitized first noise as received by the FT module 202 is represented in FIG. 2A by "z1(n)", in which "n" is the time-domain sample of the first noise.

The FT module 202 may also be configured to perform a Fourier transform (e.g., a Fast Fourier Transform) on the first noise to represent the first noise in the frequency domain. The digitized first noise in the frequency domain as output by the FT module 202 is represented in FIG. 2A by "z1(k)", in which "k" is the frequency-domain sample of the first noise.

The FT module 202 may be configured to similarly receive and perform the Fourier transform with respect to second noise that propagates along a second branch of the receive path, such as the second noise that propagates along the second branch 120b of FIG. 1. The digitized second noise as received by the FT module 202 is represented in FIG. 2A by "z2(n)", in which "n" is the time-domain sample of the second noise. The digitized second noise in the frequency domain as output by the FT module 202 is represented in FIG. 2A by "z2(k)", in which "k" is the frequency-domain sample of the second noise.

The spectral density module 204 may be configured to determine, as a first noise estimate of the first noise, a first spectral density of the first noise ("$\hat{S}_{z1}$") (e.g., using the first noise z1(k) output by the FT module 202). The spectral density module 204 may also be configured to determine, as a second noise estimate of the second noise, a second spectral density of the second noise ("$\hat{S}_{z2}$") (e.g., using the second noise z2(k) output by the FT module 202). Additionally, the spectral density module 204 may be configured to determine, as part of determining a cross-relationship estimate between the first noise and the second noise, a cross-spectral density between the first noise and the second noise ("$\hat{S}_{z1z2}$") (e.g., using the first noise z1(k) and the second noise z2(k)).

In some implementations, the determined first spectral density, the determined second spectral density, and/or the determined cross-spectral density, may be estimates of the first spectral density, the second spectral density, and/or the cross-spectral density, respectively. In some implementations, the spectral density module 204 may be configured to estimate the first spectral density, the second spectral density, and the cross-spectral density using any suitable technique. For example, the spectral density module 204 may be configured to estimate the first spectral density based on comparisons of the first noise at different times (e.g., based on comparisons between different samples of the first noise obtained at different points in time) according to any suitable technique. The second spectral density may be similarly obtained. For example, the spectral density module 204 may be configured to estimate the spectral density by first measuring the auto-correlation of the first and second noise samples and the cross-correlation of the first and second noise samples for different lags and then perform Fourier transform on the auto-correlation and cross-correlation functions to calculate the spectral density. Further, the cross-spectral density may be obtained based on different samples of the first noise and the second noise at different points in time according to any suitable technique. The number of samples used in estimating the different spectral densities may be based on various implementation and design decisions such as accuracy and speed of estimating the spectral densities. For example, the fewer the samples used, the faster the estimates may be determined, but the accuracy may be reduced, and vice versa.

The adjustment module 206a may be configured to determine a phase mismatch "$\hat{\phi}$" based on the determined spectral densities in some implementations. The determined phase mismatch "$\hat{\phi}$" may be an estimate of the phase mismatch "$\phi$" described above with respect to FIG. 1.

By way of example, in some implementations, the adjustment module 206a may be configured to determine the phase mismatch "$\hat{\phi}$" based on the spectral densities "$\hat{S}_{z1}$", "$\hat{S}_{z2}$", and "$\hat{S}_{z1z2}$" according to the following expression (2):

$$\hat{\phi} = \arcsin\left(\frac{1}{|\mathcal{K}|}\Sigma_{f_k \in \mathcal{K}} \frac{\hat{S}_{z1z2}(f_k)}{\sqrt{\hat{S}_{z1}(f_k)\hat{S}_{z2}(f_k)}}\right) \quad (2)$$

In expression (2), "$\mathcal{K}$" is a symmetric set of tones in the passband of the filters of the first and second branches that corresponds to the tones of the samples used to determine the spectral densities. Additionally, in expression (2) "$f_k$" represents the individual tones of "$\mathcal{K}$". The set "$\mathcal{K}$" is a design parameter and depending on the considered application its size and placements of its tones may be adjusted to improve estimation the phase mismatch.

In some implementations, the adjustment module 206a may be configured to determine a branch imbalance between the first branch and the second branch. The determined branch imbalance may include a frequency dependent branch imbalance and/or a frequency independent branch imbalance (also referred to as a DC branch imbalance).

In some implementations, the adjustment module 206a may be configured to determine an estimate of a frequency independent branch imbalance "$\hat{\gamma}_{DC}$" based on the determined first spectral density "$\hat{S}_{z1}$" and the determined second spectral density "$\hat{S}_{z2}$". For example, the adjustment module 206a may determine "$\hat{\gamma}_{DC}$" according to the following expression (3):

$$\hat{\gamma}_{DC} = \frac{1}{|\mathcal{K}|}\Sigma_{f_k \in \mathcal{K}}\sqrt{\frac{\hat{S}_{z2}(f_k)}{\hat{S}_{z1}(f_k)}} \quad (3)$$

Additionally or alternatively, the adjustment module 206a may also be configured to determine a frequency dependent branch imbalance "$\hat{\Gamma}(f_k)$" based on the determined phase mismatch "$\hat{\phi}$" and the determined cross-spectral density "$\hat{S}_{z1z2}$". Further, the adjustment module 206a may be configured to determine the frequency dependent branch imbalance "$\hat{\Gamma}(f_k)$" based on the determined first spectral density "$\hat{S}_{z1}$" or the determined second spectral density "$\hat{S}_{z2}$". The determined frequency dependent branch imbalance "$\hat{\Gamma}(f_k)$" may be an estimate of the branch imbalance "$\Gamma$" described above with respect to FIG. 1.

As another example, in some implementations, the adjustment module 206a may be configured to determine the frequency dependent branch imbalance "$\hat{\Gamma}(f_k)$" based on the determined phase mismatch "$\hat{\phi}$" and the spectral densities "$\hat{S}_{z1}$" and "$\hat{S}_{z1z2}$" according to the following expression (4):

$$\hat{\Gamma}(f_k) = \frac{\hat{S}^*_{z1z2}(f_k)}{\hat{S}_{z1}(f_k)\sin(\hat{\phi})} \quad (4)$$

As another example, the adjustment module 206a may be configured to determine the frequency dependent branch imbalance "$\hat{T}(f_k)$" for each of the tones "$f_k$" based on the determined phase mismatch "$\hat{\phi}$" and the spectral densities "$\hat{S}_{z2}$" and "$\hat{S}_{z1z2}$" according to the following expression (5):

$$\hat{T}(f_k) = \frac{\sin(\hat{\phi})\hat{S}^*_{z1z2}(f_k)}{\hat{S}_{z2}(f_k)} \quad (5)$$

In expressions (4) and (5) "$S_{z1z2}^*(f_k)$", represents the complex conjugate of the cross-spectral density "$\hat{S}_{z1z2}$".

In some implementations, the adjustment module 206a may also be configured to adjust the correction filter module 208 based on the determined phase mismatch "$\hat{\phi}$" and the determined branch imbalances "$\hat{\gamma}_{DC}$" and "$\hat{T}(f_k)$". For example, the adjustment module 206a may be configured to adjust, using any suitable technique, one or more of correction filters of the correction filter module 208 such that the correction filter module 208 at least partially remove the determined phase mismatch "$\hat{\phi}$" and the determined branch imbalances "$\hat{\gamma}_{DC}$" and/or "$\hat{T}(f_k)$" from signals (e.g., I-signals and Q-signals) and/or noise received at the correction filter module 208.

For instance, the one or more correction filters may be configured as Finite Impulse Response (FIR) filters in some implementations and adjusting of the correction filter module 208 may include adjusting one or more of the taps. The number of taps may vary depending on the implementation in which more taps may provide more accurate correction. The adjusting of the taps based on the determined phase mismatch "$\hat{\phi}$" and the determined branch imbalances "$\hat{\gamma}DC$" and "$\hat{T}(f_k)$" may be performed according to any suitable technique.

The correction filter module 208 may include one or more correction filters that may be configured to receive signals and/or noise from the first branch and the second branch of the receive path. The one or more correction filters may be configured to perform one or more operations on the received signals and/or noise based on input received from the adjustment module 208 that may help correct for the phase mismatch and/or the branch imbalance.

Figure 2B:
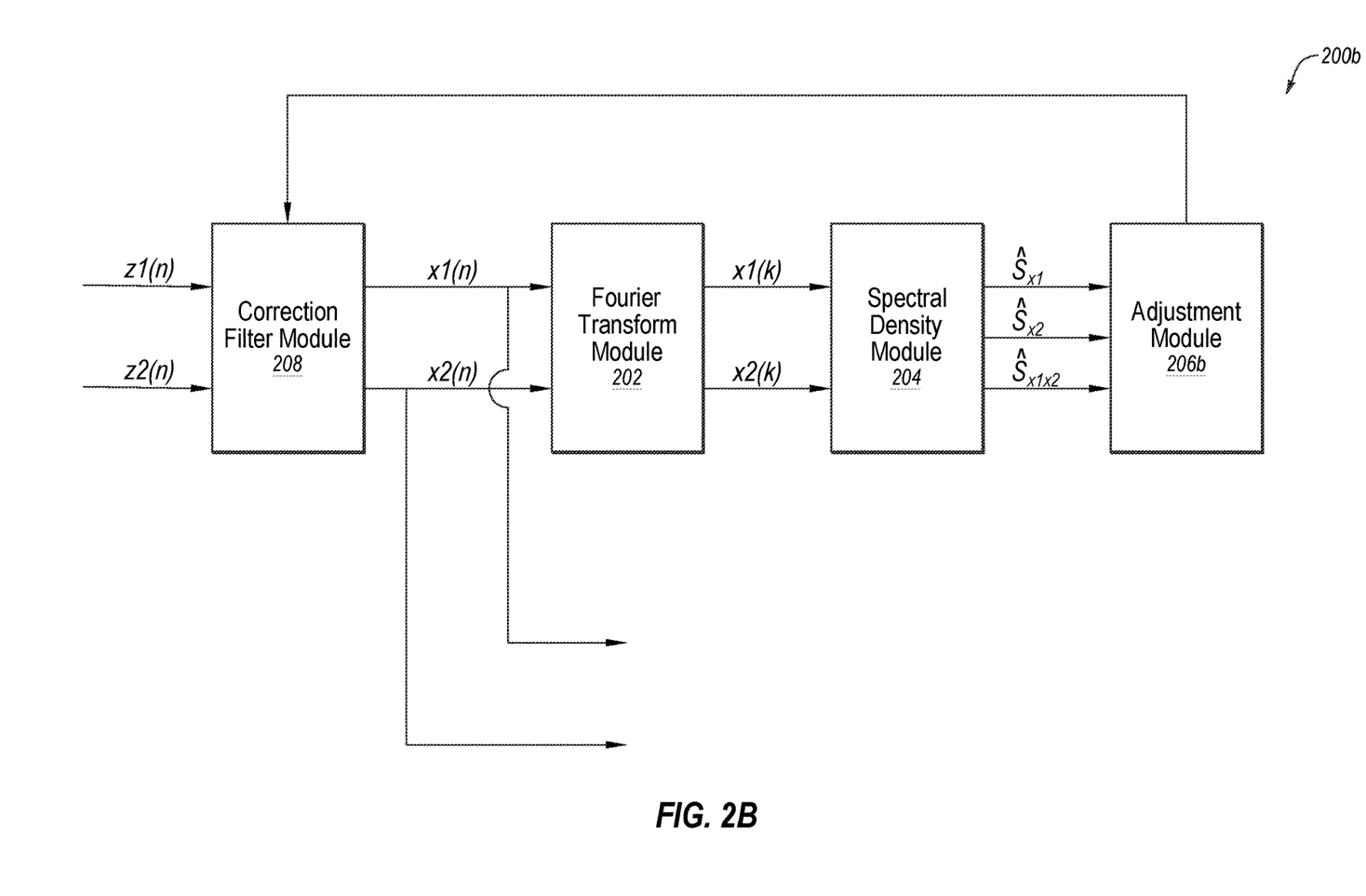
FIG. 2B illustrates another example signal processing system configured to adjust for imbalances between branches of a receive path.

FIG. 2B illustrates an example signal processing system 200b ("system 200b") that is a variation of the signal processing system 200a in that the system 200b may be configured to adaptively adjust the correction filter module 208 based on a determined first spectral density "$\hat{S}_{x1}$", a determined second spectral density "$\hat{S}_{x2}$", and a determined cross-spectral density "$\hat{S}_{x1x1}$". For example, in the adaptive configuration, the FT module 202 may be configured to receive a first output "x1(n)" and a second output "x2(n)" that may be output by the correction filter module 208. The first output "x1(n)" may be what is left of the digitized first noise "z1(n)" after the correction filter module 208 applies filtering to "z1(n)". Similarly, the second output "x2(n)" may be what is left of the digitized second noise "z2(n)" after the correction filter module 208 applies filtering to "z2(n)". The FT module 202 may accordingly transform "x1(n)" and "x2(n)" into the frequency domain as "x1(k)" and "x2(k)". The spectral density module 204 may receive "x1(k)" and "x2(k)" and may output the first spectral density "$\hat{S}_{x1}$" of "x1(k)", the second spectral density "$\hat{S}_{x2}$" of "x2(k)", and the cross-spectral density "$\hat{S}_{x1x2}$" with respect to "x1(k)" and "x2(k)".

Rather than determine the phase mismatch "$\hat{\phi}$" and the branch imbalances "$\hat{\gamma}_{DC}$" and "$\hat{T}(f_k)$", such as performed by the adjustment module 206a of FIG. 2A, an adjustment module 206b of FIG. 2B may be configured to iteratively adjust the correction filter module 208 based on comparisons between the determined first spectral density "$\hat{S}_{x1}$" the determined second spectral density "$\hat{S}_{x2}$", and the determined cross-spectral density "$\hat{S}_{x1x2}$".

For instance, during a first adjustment iteration, the adjustment module 206b may determine a first difference between the determined first spectral density "$\hat{S}_{x1}$" and the determined second spectral density "$\hat{S}_{x2}$". In a scenario in which there is little or no branch imbalance and/or phase mismatch, the determined first spectral density "$\hat{S}_{x1}$" and the determined second spectral density "$\hat{S}_{x2}$" may be the same or very close to the same such that the difference between the two would be at or very near zero. Therefore, using any suitable adjustment technique, the adjustment module 206b may adjust the filter module 208 to attempt to reduce the difference between the determined first spectral density "$\hat{S}_{x1}$" and the determined second spectral density "$\hat{S}_{x2}$".

Additionally, during the first adjustment iteration, the adjustment module 206b may analyze the determined cross-spectral density "$\hat{S}_{x1x2}$". In a scenario in which there is little or no branch imbalance and/or phase mismatch, the determined cross-spectral density "$\hat{S}_{x1x2}$" may also be at or near zero. Therefore, using any suitable adjustment technique, the adjustment module 206b may adjust the filter module 208 to attempt to move the determined cross-spectral density "$\hat{S}_{x1x2}$" toward zero.

During a second adjustment iteration that follows the first iteration, the adjustment module 206b may determine a second difference between the determined first spectral density "$\hat{S}_{x1}$" and the determined second spectral density "$\hat{S}_{x2}$". The adjustment module 206b may compare the first difference against the second difference to determine whether the second difference is larger or smaller than the first difference to determine whether the first adjustment iteration improved or worsened the imbalance and/or phase mismatch. Using any suitable technique, the adjustment module 206b may be configured to make one or more adjustments to the correction filter 208 based on whether the second difference is larger or smaller than the first difference.

The iterative adjustment in some implementations may be based on calculating a gradient function that provides the direction of the correction filters adjustment to simultaneously drive the difference between "$\hat{S}_{x1}$" and "$\hat{S}_{x2}$" and the magnitude of "$\hat{S}_{x1x2}$" toward zero.

In these or other implementations, the adjustment module 206b may compare the determined cross-spectral density "$\hat{S}_{x1x2}$" obtained with respect to the first adjustment iteration against the determined cross-spectral density "$\hat{S}_{x1x2}$" obtained with respect to the second adjustment iteration. Based on a comparison between the two determined cross-spectral densities "$\hat{S}_{x1x2}$", the adjustment module 206b may determine whether the first adjustment iteration moved the determined cross-spectral density "$\hat{S}_{x1x2}$" closer to or further from zero. Using any suitable technique, the adjustment module 206b may be configured to make one or more adjustments to the correction filter 208 based on whether the determined cross-spectral density "$\hat{S}_{x1x2}$" closer to or further from zero. In these or other implementations, the adjustment module 206b may be configured to continue to make additional iterative adjustments until the determined cross-spectral density "$\hat{S}_{x1x2}$" satisfies a first particular threshold and/or until the difference between the determined first spectral density "$\hat{S}_{x1}$" and the determined second spectral density "$\hat{S}_{x2}$" satisfies a second particular threshold. The first particular threshold and the second particular threshold may be the same or different. Further, the first particular threshold and the second particular threshold may vary depending on tolerances associated with different implementations.

The systems 200a and 200b may accordingly be configured to use noise to calibrate correction filters such that imbalances between I-signals and corresponding Q-signals may be reduced. Modifications, additions, or omissions may be made to the systems 200a and 200b without departing from the scope of the present disclosure. For example, the delineating between the modules is to facilitate explanation of concepts described in the present disclosure and is not limiting. Further, one or more of the modules may be configured to perform more, fewer, and/or different operations than those described.

Figure 3A:
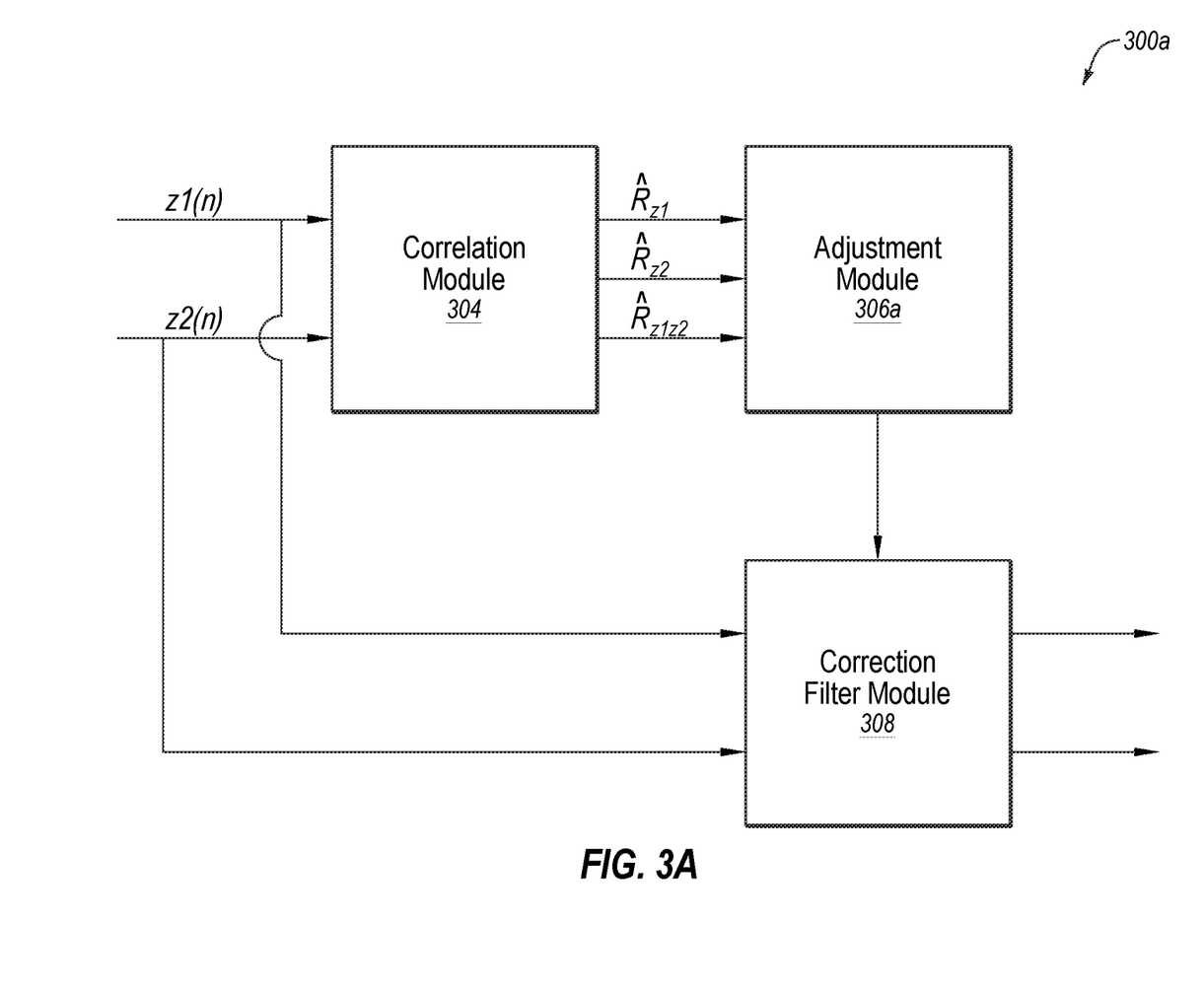
FIG. 3B illustrates another example signal processing system configured to adjust for imbalances between branches of a receive path.

FIG. 3A illustrates an example signal processing system 300a ("system 300a") configured to adjust for imbalances between branches of a receive path, according to one or more implementations of the present disclosure. The system 300a may be part of digital circuitry of a receiver system. For example, the system 300a may be included in the digital circuitry 104 of FIG. 1. Moreover, the system 300a may be included in or implemented as a computing system, such as the computing system 502 described below with respect to FIG. 5. The system 300a may include a correlation module 304, an adjustment module 306a, and a correction filter module 308.

The correlation module 304 may be configured to receive first noise that propagates along a first branch of a receive path, such as the first noise that propagates along the first branch 120a of FIG. 1. The correlation module 304 may also be configured to receive second noise that propagates along a second branch of the receive path, such as the second noise that propagates along the second branch 102b of FIG. 1. The digitized first noise as received by the correlation module 304 is represented in FIG. 3A by "z1(n)", and the digitized second noise as received by the correlation module 304 is represented in FIG. 3A by "z2(n)" in which "n" is the time-domain sample of the first noise.

The correlation module 304 may be configured to determine, as a first noise estimate of the first noise, a first autocorrelation of the first noise ("$\hat{R}_{z1}$") (e.g., using the first noise z1(n)). The correlation module 304 may also be configured to determine, as a second noise estimate of the second noise, a second autocorrelation of the second noise ("$\hat{R}_{z2}$") (e.g., using the second noise z2(n)). Additionally, the correlation module 304 may be configured to determine, as part of determining a cross-relationship estimate between the first noise and the second noise, a cross-correlation between the first noise and the second noise ("$\hat{R}_{z1z2}$") (e.g., using the first noise z1(n) and the second noise z2(n)).

In some implementations, the determined first autocorrelation, the determined second autocorrelation, and/or the determined cross-correlation, may be estimates of the first autocorrelation, the second autocorrelation, and/or the cross-correlation, respectively. In some implementations, the correlation module 304 may be configured to estimate the first autocorrelation, the second autocorrelation, and the cross-correlation using any suitable technique. For example, the correlation module 204 may be configured to estimate the first autocorrelation based on comparisons of the first noise at different times (e.g., based on comparisons between different samples of the first noise obtained at different points in time) according to any suitable technique. The second autocorrelation may be similarly obtained. Further, the cross-correlation may be obtained based on different samples of the first noise and the second noise at different points in time according to any suitable technique. The number of samples used in estimating the different correlations may be based on various implementation and design decisions such as accuracy and speed of estimating the correlations.

In some implementations, the adjustment module 306a may be configured to determine a phase mismatch "$\hat{\phi}$" based on the determined correlations. The determined phase mismatch "$\hat{\phi}$" may be an estimate of the phase mismatch "$\phi$" described above with respect to FIG. 1.

By way of example, in some implementations, the adjustment module 306a may be configured to determine the phase mismatch "$\hat{\phi}$" based on the correlations "$\hat{R}_{z1}$", "$\hat{R}_{z2}$", and "$\hat{R}_{z1z2}$" according to the following expression (6):

$$\hat{\phi} = \arcsin\left(\frac{R_{z_1z_2}(0)}{\sqrt{R_{z_1}(0)R_{z_2}(0)}}\right) \quad (6)$$

In some implementations, the adjustment module 306a may be configured to determine a branch imbalance between the first branch and the second branch. The determined branch imbalance may include a frequency dependent branch imbalance and/or a frequency independent branch imbalance (also referred to as a DC branch imbalance).

In some implementations, the adjustment module 306a may be configured to determine an estimate of a frequency independent branch imbalance "$\hat{\gamma}_{DC}$" based on the determined first autocorrelation "$\hat{R}_{z1}$" and the determined second autocorrelation "$\hat{R}_{z2}$". For example, the adjustment module 306a may determine "$\hat{\gamma}_{DC}$" according to the following expression (7):

$$\hat{\gamma}_{DC} = \sqrt{\frac{\hat{R}_{z_2}(f_k)}{\hat{R}_{z_1}(f_k)}} \quad (7)$$

The adjustment module 306a may also be configured to determine a frequency dependent branch imbalance "$\hat{\Gamma}(f_k)$" based on the determined phase mismatch "$\hat{\phi}$" and a determined cross-spectral density "$\hat{S}_{z1z2}$". Further, the adjustment module 306a may be configured to determine the frequency dependent branch imbalance "P($f_k$)" based on a determined first spectral density "$\hat{S}_{z1}$" or a determined second spectral density "$\hat{S}_{z2}$". The determined frequency dependent branch imbalance "$\hat{\Gamma}(f_k)$" may be an estimate of the branch imbalance "F" described above with respect to FIG. 1. The adjustment module 306a may be configured to determine the frequency dependent branch imbalance "P($f_k$)" according to expression (4) or expression (5) as discussed above with respect to FIG. 2A in some implementations. The adjustment module 306a may be configured to adjust the correction filter module 308 based on the determined branch imbalances "$\hat{\gamma}_{DC}$" and "$\hat{\Gamma}(f_k)$" and the determined phase mismatch "$\hat{\phi}$" such as described above with respect to the adjustment module 206a adjusting the filter module 208 of FIG. 2A.

The adjustment module 306a may be configured to determine the cross-spectral density "$\hat{S}_{z1z2}$" by performing a Fourier transform on the determined cross-correlation "$\hat{R}_{z1z2}$". The adjustment module 306a may also be configured to determine the first spectral density "$\hat{S}_{z1}$" by performing a Fourier transform on the determined first autocorrelation "$\hat{R}_{z1}$" and the adjustment module 306a may be configured to determine the second spectral density "$\hat{S}_{z2}$" by performing a Fourier transform on the determined second autocorrelation "$\hat{R}_{z2}$".

The correction filter module 308 may be analogous to the correction filter module 208 of FIGS. 2A and 2B and may include and adjust one or more correction filters that may be configured to perform one or more operations on the received signals and/or noise based on the determined phase mismatch "$\hat{\phi}$" and the determined branch imbalances "$\hat{\gamma}_{DC}$," and "$\hat{\Gamma}(f_k)$".

Figure 3B:
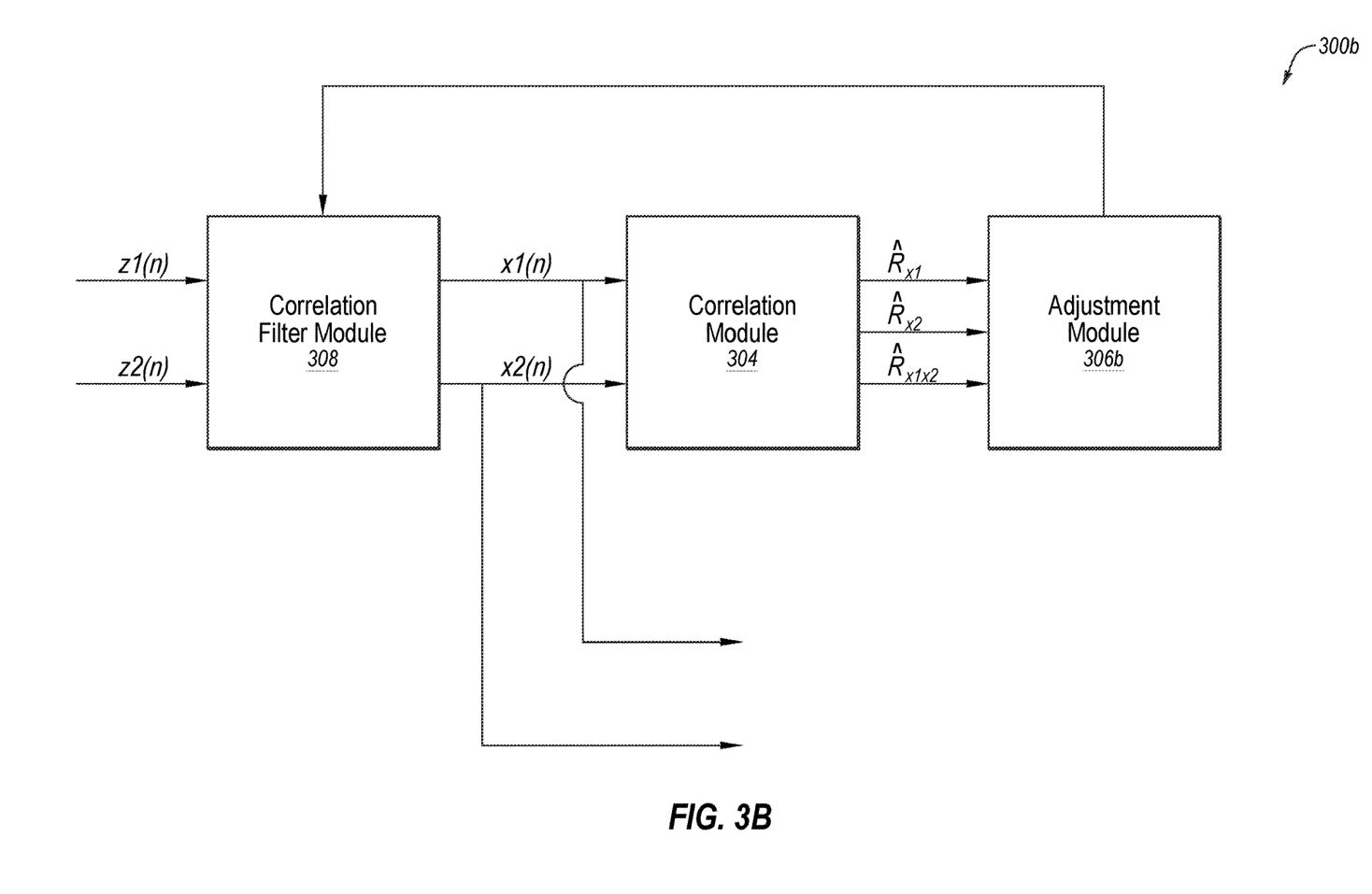

FIG. 3B illustrates an example signal processing system 300b ("system 300b") that is a variation of the signal processing system 300a in that the system 300b may be configured to adaptively adjust the correction filter module 308 based on a determined first autocorrelation "$\hat{R}_{x1}$", a determined second autocorrelation "$\hat{R}_{x2}$", and a determined cross-correlation "$\hat{R}_{x1x2}$". For example, in the adaptive configuration, the correlation module 304 may be configured to receive a first output "x1(n)" and a second output "x2(n)" that may be output by the correction filter module 308. The first output "x1(n)" may be what is left of the digitized first noise "z1(n)" after the correction filter module 308 applies filtering to "z1(n)". Similarly, the second output "x2(n)" may be what is left of the digitized second noise "z2(n)" after the correction filter module 308 applies filtering to "z2(n)". The correlation module 304 may receive "x1(n)" and "x2(n)" and may output the first autocorrelation $\hat{R}_{x1}$ of "x1(n)", the second autocorrelation "$\hat{R}_{x2}$" of "x2(n)", and the cross-correlation "$\hat{R}_{x1x2}$" with respect to "x1(n)" and "x2(n)".

In some implementations, an adjustment module 306b may be configured to adaptively adjust the correction filter module 308 via an iterative process using the determined first autocorrelation "$\hat{R}_{z1}$", the determined second autocorrelation "$\hat{R}_{z2}$", and the determined cross-correlation "$\hat{R}_{z1z2}$". The adaptive adjustment may be analogous to that described above with respect to the adjustment module 206b of FIG. 2B.

The systems 300a and 300b may accordingly be configured to use noise to calibrate correction filters such that imbalances between I-signals and corresponding Q-signals may be reduced. Modifications, additions, or omissions may be made to the systems 300a and 300b without departing from the scope of the present disclosure.

Figure 4:
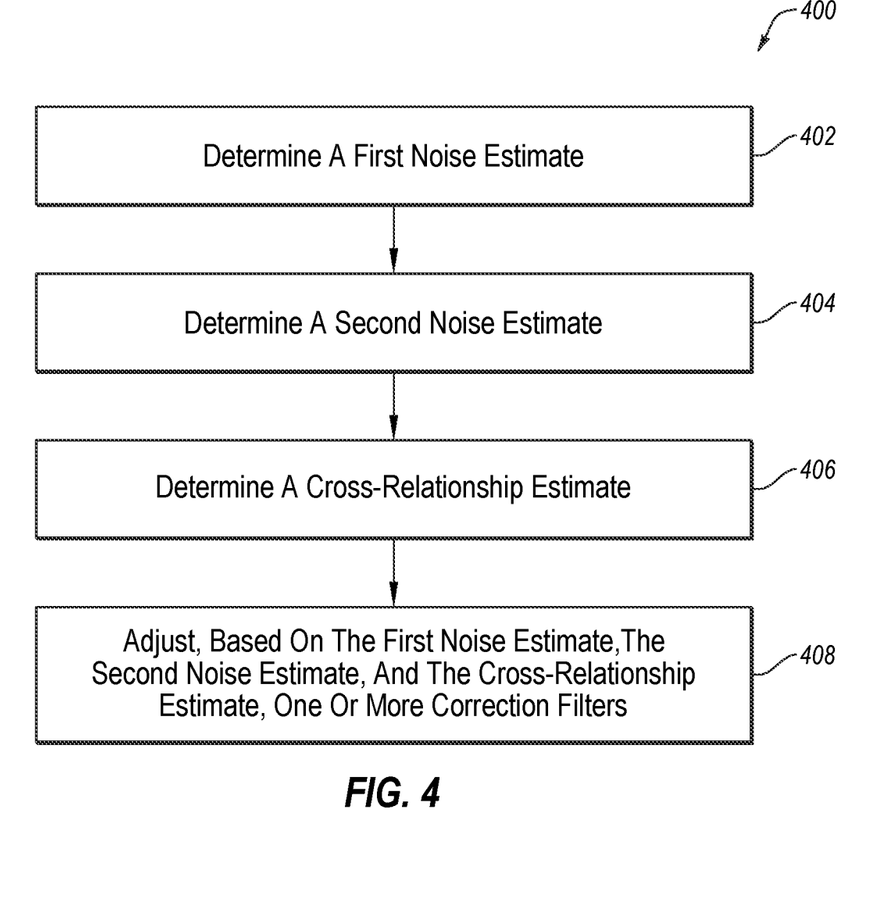
FIG. 4 is a flowchart of an example method of adjusting for imbalances between branches of a receive path.

FIG. 4 is a flowchart of an example method 400 of adjusting for imbalances between branches of a receive path, according to at least one implementation described in the present disclosure. The method 400 may be performed by any suitable system, apparatus, or device. For example, one or more operations of the method 400 may be performed by one or more of the devices of FIG. 1, by the system 200a of FIG. 2A, by the system 200b of FIG. 2B, by the system 300a of FIG. 3A, and/or by the system 300b of FIG. 3B. Additionally or alternatively, one or more of the operations may be performed or directed for performance by a computing system, such as the computing system 502 of FIG. 5. Although illustrated with discrete blocks, the steps and operations associated with one or more of the blocks of the method 400 may be divided into additional blocks, combined into fewer blocks, or eliminated, depending on the particular implementation.

At block 402, a first noise estimate of noise that propagates along a receive path of a device may be determined. The noise may include first noise that propagates along a first branch of the receive path and second noise that propagates along a second branch of the receive path, such as described above. In some implementations, the first noise estimate may be of the first noise and may be determined according to any of the techniques described above.

At block 404, a second noise estimate of the noise may be determined. In some implementations, the second noise estimate may be of the second noise and may be determined according to one or more of the techniques described above.

At block 406, a cross-relationship estimate with respect to the noise may be determined. For example, in some implementations, the cross-relationship estimate may be determined with respect to the first noise and the second noise according to one or more of the techniques described above.

At block 408, one or more correction filters configured to correct for imbalances associated with the first branch and the second branch of the receive path may be adjusted. The adjustment may be based on the first noise estimate, the second noise estimate, and the cross-relationship estimate according to one or more of the techniques described above in some implementations.

Modifications may be made to the method 400 without departing from the scope of the present disclosure. For example, in some implementations, some of the operations of the method 400 may be in a different order than described. Further, additional operations may be included in the method 400 or one or more operations may be omitted.

Figure 5:
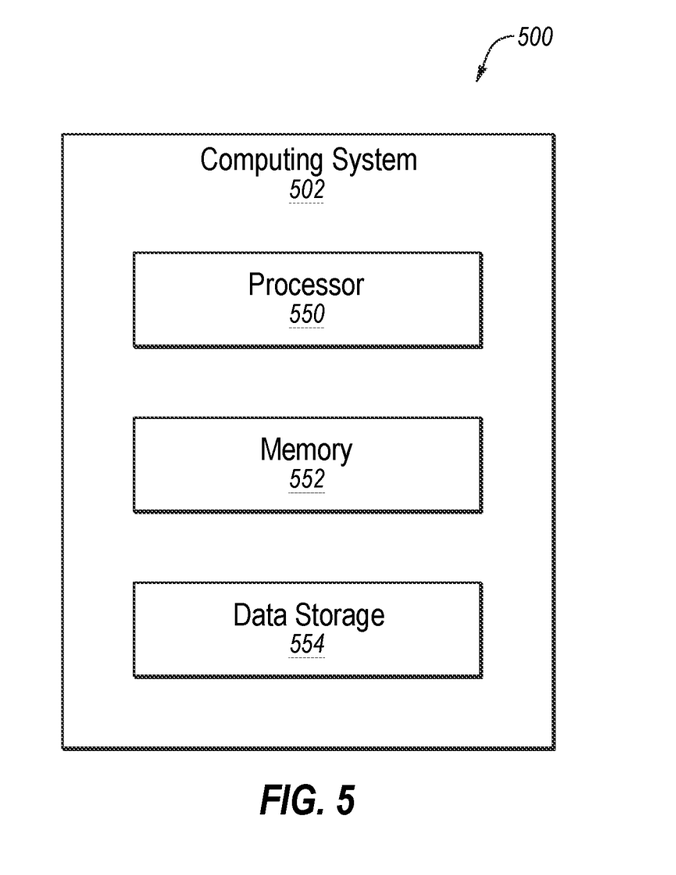
FIG. 5 illustrates a block diagram of an example computing system that may be used to perform or direct performance of one or more operations described according to at least one implementation of the present disclosure.

FIG. 5 illustrates a block diagram of an example computing system 502 that may be used to perform or direct performance of one or more operations described according to at least one implementation of the present disclosure. The computing system 502 may be included in the digital circuitry 104 of FIG. 1, the system 200a of FIG. 2A, the system 200b of FIG. 2B, the system 300a of FIG. 3A, and/or the system 300b of FIG. 3B in some implementations. Additionally or alternatively, the computing system 502 may include the one or more of the modules of FIGS. 2A, 2B, 3A, and 3B, respectively and/or one or more of the modules of FIGS. 2 and 3 may be configured as the computing system 502. The computing system 502 may include a processor 550, a memory 552, and a data storage 554. The processor 550, the memory 552, and the data storage 554 may be communicatively coupled.

In general, the processor 550 may include any suitable special-purpose or general-purpose computer, computing entity, or processing device including various computer hardware or software modules and may be configured to execute instructions stored on any applicable computer-readable storage media. For example, the processor 550 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor in FIG. 5, the processor 550 may include any number of processors configured to, individually or collectively, perform or direct performance of any number of operations described in the present disclosure.

In some implementations, the processor 550 may be configured to interpret and/or execute computer-executable instructions and/or process data stored in the memory 552, the data storage 554, or the memory 552 and the data storage 554. In some implementations, the processor 550 may fetch computer-executable instructions from the data storage 554 and load the computer-executable instructions in the memory 552. After the computer-executable instructions are loaded into memory 552, the processor 550 may execute the computer-executable instructions.

The memory 552 and the data storage 554 may include computer-readable storage media for carrying or having computer-executable instructions or data structures stored thereon. Such computer-readable storage media may include any available media that may be accessed by a general-purpose or special-purpose computer, such as the processor 550. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 550 to perform a certain operation or group of operations.

Modifications may be made to the computing system 502 without departing from the scope of the present disclosure. For example, in some implementations, the computing system 502 may include any number of other components that may not be explicitly illustrated or described. Additionally or alternatively, the computing system 502 may include fewer components. For example, the computing system 502 may omit the memory 552 and/or the data storage 554 in some implementations.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

An example method may include determining a first noise estimate of first noise that propagates along a first branch of a receive path of a device; determining a second noise estimate of second noise that propagates along a second branch of the receive path; determining a cross-relationship estimate between the first noise and the second noise; and adjusting, based on the first noise estimate, the second noise estimate, and the cross-relationship estimate, one or more correction filters configured to correct for imbalances associated with the first branch and the second branch of the receive path.

An example system may include hardware configured to perform operations including: determining a first noise estimate of noise that propagates along a receive path of a device; determining a second noise estimate of the noise; determining a cross-relationship estimate with respect to the noise; and adjusting, based on the first noise estimate, the second noise estimate, and the cross-relationship estimate, one or more correction filters configured to correct for imbalances between a first branch and a second branch of the receive path.

Another example may include one or more non-transitory computer-readable storage media having instructions stored thereon that, in response to being executed by one or more processors, cause a system to perform operations including: determining a first noise estimate of noise that propagates along a receive path of a device; determining a second noise estimate of the noise; determining a cross-relationship estimate with respect to the noise; determining a phase mismatch of a mixer of the receive path based on the first noise estimate, the second noise estimate, and the cross-relationship estimate; determining a branch imbalance (e.g., frequency independent and/or frequency dependent) between a first branch and a second branch of the receive path based on the determined phase mismatch; and adjusting, based on the determined phase mismatch and the determined branch imbalance, one or more correction filters configured to correct for imbalances between the first branch and the second branch.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, translating from the plural to the singular or from the singular to the plural may be performed as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, or C, etc." or "at least one of A, B, and C, etc." is used such a construction is intended to generally have a disjunctive interpretation (e.g., "a system having at least one of A, B, or C" or "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B." This interpretation of the phrase "A or B" is still applicable even though the term "A and/or B" may be used at times to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
determining a first noise estimate of first noise that propagates along a first branch of a receive path of a device;
determining a second noise estimate of second noise that propagates along a second branch of the receive path;
determining a cross-relationship estimate between the first noise and the second noise;
determining a frequency independent branch imbalance between the first branch and the second branch based on the first noise estimate and the second noise estimate; and
adjusting one or more correction filters configured to correct for imbalances associated with the first branch and the second branch of the receive path based on the first noise estimate, the second noise estimate, and the cross-relationship estimate, wherein adjusting the one or more correction filters based on the first noise estimate, the second noise estimate, and the cross-relationship estimate includes adjusting the one or more correction filters based on the determined frequency independent branch imbalance.

2. The method of claim 1, wherein:
determining the first noise estimate includes determining a first autocorrelation of the first noise;
determining the second noise estimate includes determining a second autocorrelation of the second noise; and
determining the cross-relationship estimate includes determining a cross-correlation between the first noise and the second noise.

3. The method of claim 1, wherein:
determining the first noise estimate includes determining a first spectral density of the first noise;
determining the second noise estimate includes determining a second spectral density of the second noise;

determining the cross-relationship estimate includes determining a cross-spectral density between the first noise and the second noise.

4. The method of claim 1, further comprising determining a phase mismatch of a mixer of the receive path based on the first noise estimate, the second noise estimate, and the cross-relationship estimate, wherein adjusting the one or more correction filters based on the first noise estimate, the second noise estimate, and the cross-relationship estimate includes adjusting the one or more correction filters based on the determined phase mismatch.

5. A method comprising:
 determining a first noise estimate of first noise that propagates along a first branch of a receive path of a device;
 determining a second noise estimate of second noise that propagates along a second branch of the receive path;
 determining a cross-relationship estimate between the first noise and the second noise;
 determining a phase mismatch of a mixer of the receive path based on the first noise estimate, the second noise estimate, and the cross-relationship estimate;
 determining a frequency dependent branch imbalance between the first branch and the second branch based on the determined phase mismatch, the first noise estimate, the second noise estimate, and the cross-relationship estimate; and
 adjusting one or more correction filters configured to correct for imbalances associated with the first branch and the second branch of the receive path based on the first noise estimate, the second noise estimate, and the cross-relationship estimate, wherein adjusting the one or more correction filters based on the first noise estimate, the second noise estimate, and the cross-relationship estimate includes adjusting the one or more correction filters based on the determined phase mismatch and the determined frequency dependent branch imbalance.

6. The method of claim 1, further comprising:
 determining a difference between the first noise estimate and the second noise estimate; and
 wherein adjusting the one or more correction filters is based on the determined difference.

7. The method of claim 6, wherein the adjustment is adaptive and configured to drive the determined difference towards zero.

8. The method of claim 1, wherein adjusting the one or more correction filters based on the cross-relationship estimate is based on whether a value of the cross-relationship estimate is moving toward zero during an adaptive adjustment process.

9. A system comprising:
 hardware configured to perform operations, the operations comprising:
  determining a first noise estimate of noise that propagates along a receive path of a device, including determining a first spectral density of first noise that propagates along the first branch;
  determining a second noise estimate of the noise, including determining a second spectral density of second noise that propagates along the second branch;
  determining a cross-relationship estimate with respect to the noise, including determining a cross-spectral density between the first noise and the second noise; and
  adjusting one or more correction filters configured to correct for imbalances between a first branch and a second branch of the receive path, the adjusting being based on the first noise estimate, the second noise estimate, and the cross-relationship estimate.

10. The system of claim 9, wherein the operations further comprise:
 determining a phase mismatch of a mixer of the receive path based on the first noise estimate, the second noise estimate, and the cross-relationship estimate; and
 determining a branch imbalance between the first branch and the second branch based on the determined phase mismatch; and
 wherein adjusting the one or more correction filters based on the first noise estimate, the second noise estimate, and the cross-relationship estimate includes adjusting the one or more correction filters based on the determined phase mismatch and the determined branch imbalance and wherein the adjusting improves run-time performance of the one or more correction filters.

11. The system of claim 10, wherein determining the branch imbalance based on the determined phase mismatch includes determining the branch imbalance based on a relationship between the phase mismatch and the cross-relationship estimate.

12. The system of claim 10, wherein determining the branch imbalance is further based on at least one of: the first noise estimate or the second noise estimate.

13. The system of claim 9, wherein:
 determining the first noise estimate further includes determining a first autocorrelation of first noise that propagates along the first branch;
 determining the second noise estimate further includes determining a second autocorrelation of second noise that propagates along the second branch; and
 determining the cross-relationship estimate further includes determining a cross-correlation with respect to the noise.

14. The system of claim 9, wherein the operations further comprise:
 determining a difference between the first noise estimate and the second noise estimate;
 determining that a value associated with the cross-relationship estimate is moving toward zero during an adaptive adjustment process; and
 wherein adjusting the one or more correction filters based on the first noise estimate and the second noise estimate is based on the determined difference and is based on the value moving toward zero.

15. One or more non-transitory computer-readable storage media having instructions stored thereon that, in response to being executed by one or more processors, cause a system to perform operations, the operations comprising:
 determining a first noise estimate of noise that propagates along a receive path of a device;
 determining a second noise estimate of the noise;
 determining a cross-relationship estimate with respect to the noise;
 determining a phase mismatch of a mixer of the receive path based on the first noise estimate, the second noise estimate, and the cross-relationship estimate;
 determining a branch imbalance between a first branch and a second branch of the receive path based on the determined phase mismatch; and
 adjusting one or more correction filters configured to correct for imbalances between the first branch and the second branch, the adjusting being based on the determined phase mismatch and the determined branch imbalance.

16. The one or more computer-readable storage media of claim 15, wherein:
    determining the first noise estimate includes determining a first autocorrelation of first noise that propagates along the first branch; and
    determining the second noise estimate includes determining a second autocorrelation of second noise that propagates along the second branch.

17. The one or more computer-readable storage media of claim 15, wherein:
    determining the first noise estimate includes determining a first spectral density of first noise that propagates along the first branch; and
    determining the second noise estimate includes determining a second spectral density of second noise that propagates along the second branch.

18. The one or more computer-readable storage media of claim 15, wherein determining the branch imbalance based on the determined phase mismatch includes determining the branch imbalance based on a relationship between the determined phase mismatch and the cross-relationship estimate.

19. The one or more computer-readable storage media of claim 15, wherein the operations further comprise:
    determining a difference between the first noise estimate and the second noise estimate;
    determining that a value associated with the cross-relationship estimate is moving toward zero during an adaptive adjustment process; and
    wherein adjusting the one or more correction filters based on the first noise estimate and the second noise estimate is based on the determined difference and is based on the value moving toward zero.

* * * * *